(12) United States Patent
Machida et al.

(10) Patent No.: US 8,151,406 B2
(45) Date of Patent: Apr. 10, 2012

(54) WIPER BLADE

(75) Inventors: Ken Machida, Kiryu (JP); Masaru Fujiwara, Kiryu (JP); Jun Abe, Kiryu (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 1310 days.

(21) Appl. No.: 11/718,767

(22) PCT Filed: Oct. 31, 2005

(86) PCT No.: PCT/JP2005/020040
§ 371 (c)(1),
(2), (4) Date: May 7, 2007

(87) PCT Pub. No.: WO2006/051722
PCT Pub. Date: May 18, 2006

(65) Prior Publication Data
US 2008/0098559 A1 May 1, 2008

(30) Foreign Application Priority Data
Nov. 9, 2004 (JP) ................................. 2004-325347

(51) Int. Cl.
*B60S 1/38* (2006.01)
(52) U.S. Cl. ........... 15/250.201; 15/250.44; 15/250.361; 15/250.46
(58) Field of Classification Search ............. 15/250.361, 15/250.43, 250.44, 250.201, 250.46, 250.451, 15/250.452, 250.48, 250.47
See application file for complete search history.

(56) References Cited

U.S. PATENT DOCUMENTS

| 2,616,113 | A | | 11/1952 | Scinta | |
|---|---|---|---|---|---|
| 3,037,233 | A | * | 6/1962 | Peras et al. | 15/250.201 |
| 3,094,734 | A | * | 6/1963 | Hoyler | 15/250.451 |
| 4,794,664 | A | | 1/1989 | Arai | |
| 5,946,764 | A | * | 9/1999 | Tworzydlo | 15/250.201 |
| 6,944,905 | B2 | | 9/2005 | De Block et al. | 15/250.201 |
| 2002/0133897 | A1 | | 9/2002 | De Block et al. | |
| 2003/0074763 | A1 | | 4/2003 | Egner-Walter et al. | |
| 2004/0111820 | A1 | | 6/2004 | Aoyama et al. | 15/250.201 |

(Continued)

FOREIGN PATENT DOCUMENTS
DE 3339414 * 5/1986
(Continued)

OTHER PUBLICATIONS
European Search Report for EP 05805437 dated Sep. 30, 2008.
(Continued)

*Primary Examiner* — Gary Graham
(74) *Attorney, Agent, or Firm* — McCormick, Paulding & Huber LLP

(57) ABSTRACT

A wiper blade 13 comprises a rubber holder 17 attached to a tip of a wiper arm 14 and a blade rubber 16 supported by the rubber holder 17. The rubber holder 17 is formed into a U-shaped cross section, and an intermediate portion of the blade rubber 16 is covered with the rubber holder 17. Also, both sides of the rubber holder 17 are provided with covers 18 in a longitudinal direction in series. Each of the cover 18 becomes rotatable to the rubber holder 17 in a direction perpendicular to a front windshield glass 12, and exposed portions from the rubber holder 17 of the blade rubber 16 are covered with these covers 18 in an elastically deformable state.

6 Claims, 17 Drawing Sheets

U.S. PATENT DOCUMENTS

2006/0162114 A1     7/2006    Hoshino

FOREIGN PATENT DOCUMENTS

| | | |
|---|---|---|
| DE | 100 36 122 A1 | 4/2002 |
| EP | 1 289 806 B1 | 4/2001 |
| EP | 1541433 A1 | 6/2005 |
| FR | 2448460 A1 | 9/1980 |
| FR | 2751597 A1 | 1/1998 |
| FR | 2751598 A1 | 1/1998 |
| GB | 1 403 970 | 8/1975 |
| JP | 52-3173 | 1/1977 |
| JP | 2003-534973 T | 11/2003 |
| JP | 2004-189185 | 7/2004 |
| WO | 0149537 A2 | 7/2001 |
| WO | 0192073 A1 | 12/2001 |
| WO | 2004012967 A1 | 2/2004 |

OTHER PUBLICATIONS

International Search Report for Serial No. PCT/JP2005/020040 dated Jan. 10, 2006.

Chinese Office Action and English translation received for Application Serial No. 200580038044.2 dated Jun. 6, 2008.

Communication for corresponding European Patent Application No. 05 805 437.0-2424 dated Feb. 11, 2011.

* cited by examiner

WIPER BLADE

CROSS REFERENCE TO RELATED APPLICATIONS

This application is entitled to the benefit of and incorporates by reference essential subject matter disclosed in International Patent Application No. PCT/JP2005/020040 filed on Oct. 31, 2005 and Japanese Patent Application No. 2004-325347 filed Nov. 9, 2004.

TECHNICAL FIELD

The present invention relates to a wiper blade that wipes a windshield glass of a vehicle.

BACKGROUND ART

A vehicle such as a passenger car, a bus, and a truck is provided with a wiper blade for wiping rain, snow, insects, droplets from a preceding vehicle, or the like adhering to on a front windshield glass or rear windshield glass to ensure a view of a driver. Such a wiper blade has a rubber holder attached to a tip of a wiper arm of the vehicle and a rubber-made blade rubber held by the rubber holder, so that when the wiper arm is driven by a wiper motor, the wiper blade reciprocates within a wiping range on a windshield glass to wipe a glass face.

In order to provide good wiping performance, it is necessary to make an entire longitudinal-directional portion of the blade rubber contact uniformly with the glass face. For this reason, in the wiper blade shown in, for example, Patent Document 1, a leaf-spring member that is curved stronger than the glass face is mounted in an attaching groove formed in the blade rubber and simultaneously the blade rubber is held at two positions by a rubber holder provided with holding claws at both end portions in a longitudinal direction thereof. Thereby, when a pressing force from a wiper arm is applied to the blade rubber via the rubber holder, the leaf-spring member is elastically deformed in form of conforming with the glass face so that the pressing force is dispersed over the entire longitudinal-directional portion of the blade rubber, thereby making it possible to make the blade rubber contact with the glass face with predetermined distributed pressure.
Patent Document 1: Japanese Patent No. 52-3173

DISCLOSURE OF THE INVENTION

In such a wiper blade, however, since the two positions of both end portions of the blade rubber in the longitudinal direction is held by the rubber holder, a portion of the blade rubber extending beyond the rubber holder is put in an exposed state to the outside. Therefore, burrs or the like occurring when the attaching groove on which the leaf-spring member is mounted or when the blade rubber is molded can be viewed from the outside, which results in such a problem that fine appearance of the wiper blade is poor.

An object of the present invention is to improve fine appearance by covering a blade rubber with a cover.

A wiper blade according to the present invention wipes a windshield glass of a vehicle and comprises: a rubber holder attached to a tip of a wiper arm performing swinging motion on the windshield glass; a blade rubber held by the rubber holder to contact with the windshield glass; a leaf-spring member formed elastically deformably in a direction perpendicular to the windshield glass and attached to the blade rubber to disperse a pressing force of the wiper arm in a longitudinal direction of the blade rubber; and a cover provided so as to be aligned in the longitudinal direction of the rubber holder and to be swingable to the rubber holder in a direction perpendicular to the windshield glass, the cover covering the blade rubber in a state in which the blade rubber is elastically deformable in the direction perpendicular to the windshield glass.

The wiper blade according to the present invention is such that a holding piece is provided to the cover and the cover is mounted on the blade rubber by holding a holding groove of the blade rubber.

The wiper blade according to the present invention is such that the rubber holder is formed into a U-shaped cross section having a top wall portion extending in the longitudinal direction of the rubber holder and a pair of side wall portions extending from both sides of the top wall portion toward the windshield glass, holding claws engaged with the holding grooves are respectively provided to both end portions of the side walls in a longitudinal direction of the side walls, and an intermediate portion of the blade rubber is covered with the rubber holder.

The wiper blade according to the present invention is such that the cover and the rubber holder is rotatably linked in the direction perpendicular to the windshield glass.

The wiper blade according to the present invention is such that an engagement projection protruding toward the rubber holder is provided to the cover, an engagement hole opened toward the cover is provided in the rubber holder, and the engagement projection is inserted into and engaged with the engagement hole.

The wiper blade according to the present invention is such that an engagement piece protruding toward the windshield glass is provided to the top wall portion of the rubber holder, a pair of leg portions protruding toward the rubber holder is provided to the cover, and the cover is assembled to the rubber holder by disposing the leg portions between the engagement piece and the side walls, respectively.

The wiper blade according to the present invention is such that supporting convex portions abutting on a rear face of the blade rubber are provided to the leg portions.

The wiper blade according to the present invention is such that engagement concave portions rotatably engaged with a projecting portion provided to the engagement piece are provided to the leg portions, and the supporting convex portions are formed in semi-cylindrical shapes coaxial to the engagement concave portions.

The wiper blade according to the present invention is such that fin portions extending along respective longitudinal-directional portions of a top wall portion of the rubber holder and a top wall portion of the cover are provided to the top wall portion of the rubber holder and the top wall portion of the cover.

The wiper blade according to the present invention is such that the fin portions includes wind receiving faces inclined in a direction of separating from the windshield glass from a front side of the vehicle toward a rear side thereof when the wiper arm is at a stoppage position.

The wiper blade according to the present invention is such that the covers are provided on both sides of the rubber holder, respectively, and a notched portion is formed in an end wall portion of at least one of the covers.

The wiper blade according to the present invention is such that the notched portions are provided in both end wall portions of the covers, respectively, and both tips of the blade rubber protrude from the notched portions of the cover, respectively.

The wiper blade according to the present invention is such that the blade rubber is inserted from the notched portion and mounted on the covers and the rubber holder.

According to the present invention, since the cover is provided so as to be aligned with the rubber holder in the longitudinal direction thereof, the entire longitudinal-directional portion of the blade rubber can be covered with the rubber holder and the covers. Therefore, the attaching groove to be mounted on the leaf-spring member, burrs occurring in molding the blade rubber, or the like can be concealed so that fine appearance can be improved. Especially, the rubber holder is formed so as to have a U-shaped cross section, so that the wiper blade can be formed into a shape with a sense of unity.

According to the present invention, a plurality of kinds of covers different in length dimension are used, so that the same kind of rubber holders can be shared with a plurality of kinds of blade rubbers different in length dimension, which results in enhancing versatility of the wiper blade.

Further, according to the present invention, since the blade rubber is assembled to the cover from the tip thereof, the cover is formed into such a shape to cover even a tip face of the blade rubber in the longitudinal direction, whereby the fine appearance can be further improved. Also, since the cover can be mounted after the blade rubber is mounted on the rubber holder, a mounting property of the cover can be enhanced.

Further, according to the present invention, since the fin portions are provided to the top wall portion of the cover holder and the top wall portion of the cover, floating of the wiper blade during running of the vehicle is prevented, whereby the wiping performance of the wiper blade can be improved.

BEST MODE FOR CARRYING OUT THE INVENTION

Embodiments of the present invention will be described below in detail with reference to the drawings.

Figure 1:
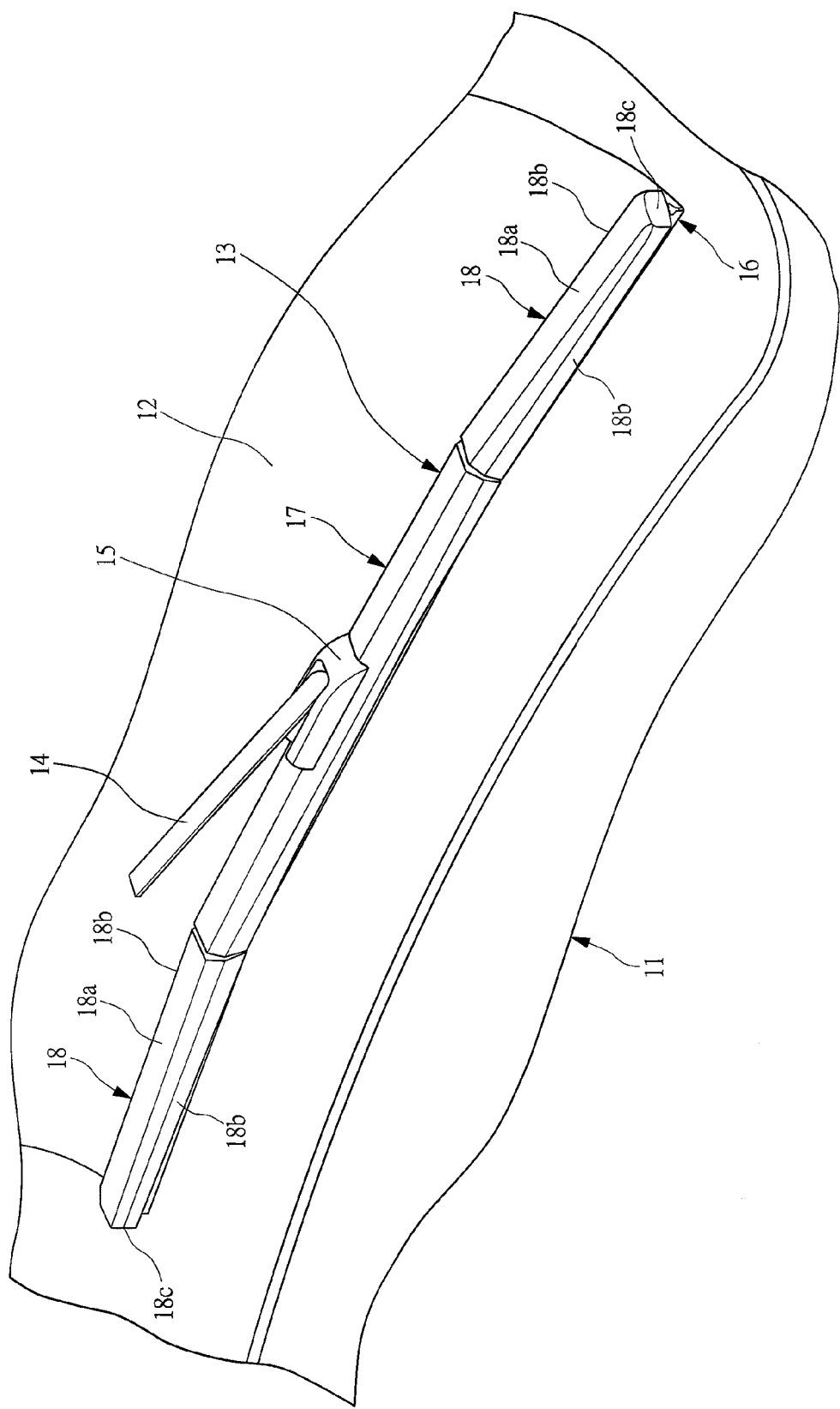
FIG. 1 is a perspective view showing a usage state of a wiper blade according to an embodiment of the present invention.

A vehicle 11 shown in FIG. 1 is provided with a wiper blade 13 for wiping adhesion matters such as rain water or droplets from a preceding car adhering to a front windshield glass 12 (hereinafter called "windshield glass 12"). The wiper blade 13 is attached via an attaching portion 15 to a tip of a wiper arm 14 swingably provided on the vehicle 11, so that when the wiper arm 14 is driven by an unshown wiper motor, the wiper blade 13 together with the wiper arm 14 carries out swinging movement on the windshield glass 12 to wipe the windshield glass 12.

Figure 2:
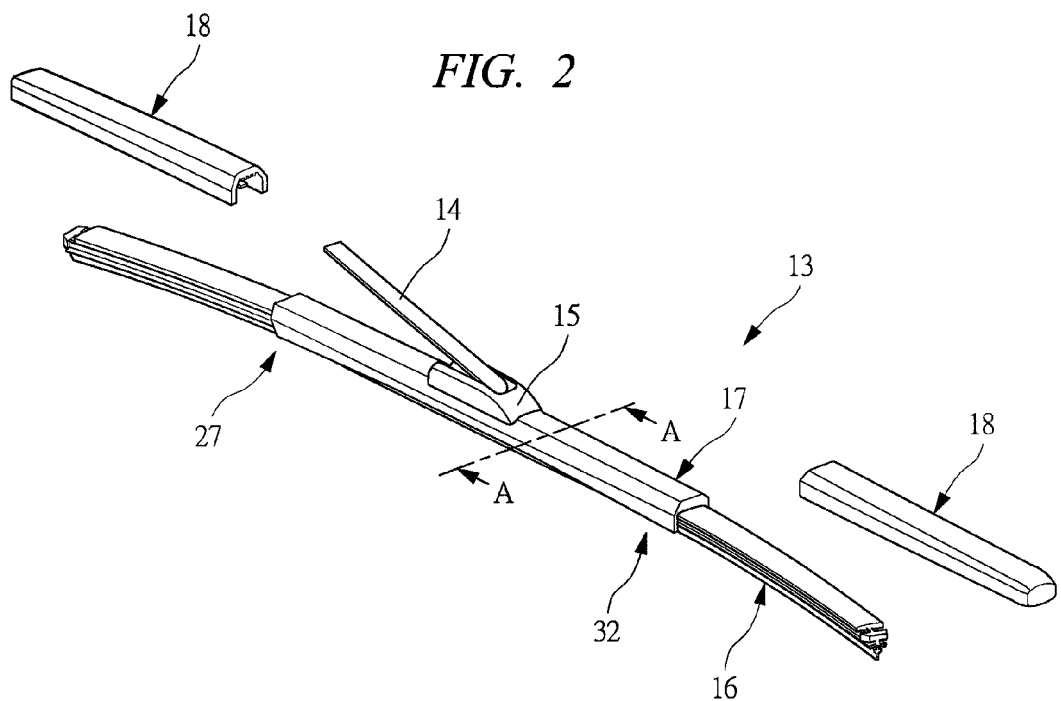
FIG. 2 is a perspective view showing a state of removing a cover of the wiper blade shown in FIG. 1.

FIG. 2 is a perspective view showing a state of removing a cover of the wiper blade shown in FIG. 1. As understood from FIG. 2, the wiper blade 13 has a structure in which a blade rubber 16 contacting with the windshield glass 12 is held by a rubber holder 17. Also, a pair of covers 18 are provided on both side portions of the rubber holder 17 in a longitudinal direction thereof, and the entire blade rubber 16 is covered with the rubber holder 17 and the pair of covers 18, as shown in FIG. 1. Incidentally, the cover 18 will be detailed below.

Figure 3:
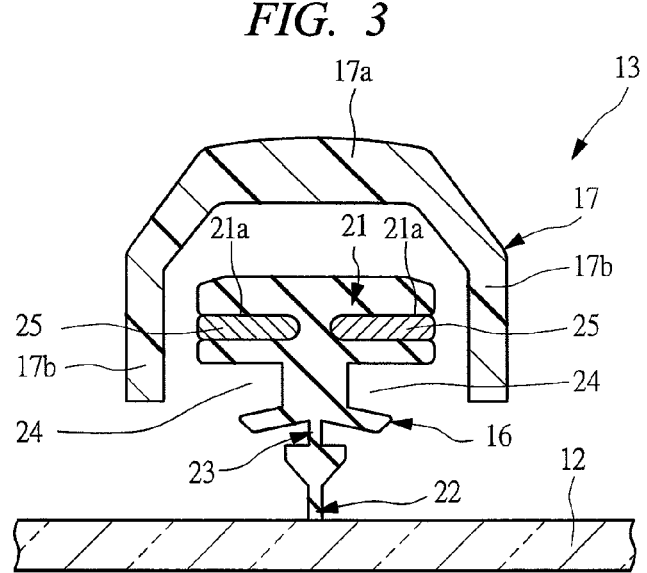
FIG. 3 is a sectional view taken along line A-A shown in FIG. 2.
Figure 4A:
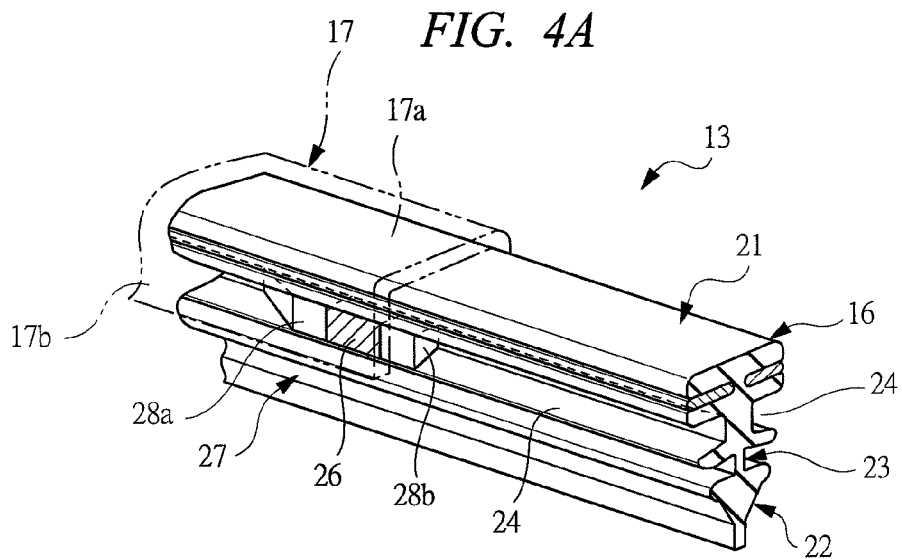
FIGS. 4A and 4B are explanatory diagrams each showing a detail of a holding portion shown in FIG. 2.
Figure 4B:
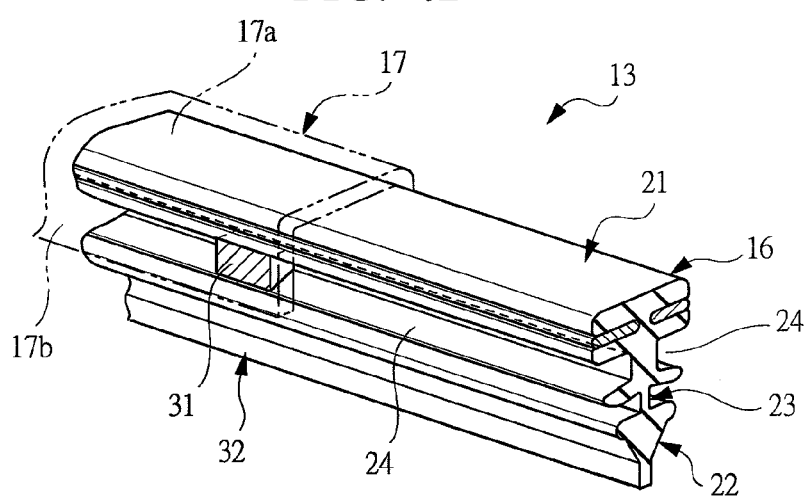

FIG. 3 is a sectional view taken along line A-A shown in FIG. 2, and FIGS. 4A and 4B are explanatory diagrams each showing a detail of a holding portion shown in FIG. 2.

As shown in FIG. 3, the blade rubber 16 is made of a material such as natural rubber or synthetic rubber and is formed into a rod shape with a uniform section along a longitudinal direction, the rod shape including a head portion 21 with a rectangular cross section, a lip portion 22, and a neck portion 23, wherein the blade rubber 16 contacts with the windshield glass 12 at the lip portion 22. Width of the neck portion 23 is formed so as to be narrower in a wiping direction than those of the head portion 21 and the lip portion 22, whereby the lip portion 22 is made tiltable to the head portion 21 in the wiping direction.

Holding grooves 24 opened to both side faces in the wiping direction and extending in the longitudinal direction are formed between the head portion 21 and the neck portion 23, respectively. Attaching grooves 21a are formed on both side faces of the head portion 21 so as to extend in the longitudinal direction, and leaf-spring members 25 are mounted into the attaching grooves 21a, respectively.

These leaf-spring members 25 are each formed into a flat plate with a length dimension approximately equal to that of the blade rubber 16 by applying punching work to a plate material such as a steel plate, thereby being elastically deformable in a direction perpendicular to the windshield glass 12. Therefore, the blade rubber 16 in which the leaf-spring members 25 are mounted can be elastically deformed integrally with the leaf-spring members 25 in a direction perpendicular to the windshield glass 12, namely, in a direction where a degree of curvature varies. Also, the leaf-spring members 25 in natural states are each curved more strongly toward an elastically deformable direction than the curvature of the windshield glass 12, whereby the blade rubber 16 in which the leaf-spring members 25 are mounted is curved more strongly in a state of separating from the windshield glass 12 than the windshield glass 12.

Incidentally, when being illustrated, the leaf-spring members 25 are formed of a steel plate, but are not limited to this and may be formed of a material elastically deformable in the direction perpendicular to the windshield glass 12, such as formation using, for example, a hard resin.

Meanwhile, as shown in FIG. 3, the rubber holder 17 is made of a resin material and is formed into a U-shaped cross section, which includes a top wall portion 17a extending in the longitudinal direction and a pair of side walls 17b extending from both side portions of the top wall portion 17a toward the windshield glass 12, and it has length of about a half of that of the blade rubber 16. Thereby, an intermediate portion of the blade rubber 16 is covered with the rubber holder 17, so that only the lip portion 22 becomes in an exposed state. The abovementioned attaching portion 15 is fixed to an approximately intermediate portion of the top wall portion 17a in the longitudinal direction, and the rubber holder 17 is attached to a tip of the wiper arm 14 via the attaching portion 15.

As shown in FIG. 4A, each of the side wall portions 17b of the rubber holder 17 is provided with a pair of first holding claws 26 (although only one side of them is shown in FIG. 4A, a similar holding claw is provided also on the other side) at positions of on one ends thereof in the longitudinal direction thereof (end portions near a swinging center of the wiper arm 14 when the wiper blade 13 is attached to the wiper arm 14), and a holding portion 27 is provided at an end portion of the rubber holder 17 by the first holding claws 26. The first holding claws 26 are each formed into a projection shape with a rectangular cross section so as to protrude from the side wall portions 17b toward a direction perpendicular to the longitudinal direction of the blade rubber 16 and parallel with the wiping direction, and, as shown in FIG. 4A, they are engaged with the holding grooves 24 to hold the blade rubber 16. A pair of stopper portions 28a and 28b clamping each of the first holding claws 26 from the longitudinal direction are provided in the holding groove 24, and movement of the first holding claws 26 to the blade rubber 16 in a direction extending along the holding groove 24 is restricted by the stopper portions 28a and 28b. That is, the blade rubber 16 is held, by the rubber holder 17, in the holding portion 27 in a state of being positioned in the longitudinal direction.

Similarly, as shown in FIG. 4B, second holding claws 31 with rectangular cross sections are provided to the other ends of the side walls 17b in the longitudinal direction, and a holding portion 32 is provided to the other end portion of the rubber holder 17 by the second holding claw 31. The second holding claws 31 are engaged with the holding grooves 24, so that the blade rubber 16 is held. Any stopper portion is not provided to a portion engaged with the second holding claw 31 in the holding groove 24, so that the second holding claw 31 is movable along the holding groove 24. That is, the blade rubber 16 is held at the holding portion 32 so as to be movable in an axial direction to the rubber holder 17.

Thus, in the wiper blade 13, the blade rubber 16 is provided with the holding portions 27 and 33 at both end portions of the rubber holder 17 in the longitudinal direction and holds the rubber holder 17 at two positions of the holding portions 27 and 32. Accordingly, when a pressing force from the wiper arm 14 is applied to the rubber holder 17 via the attaching portion 15, the pressing force is applied to the blade rubber 16 from the two positions of both end portions of the rubber holder 17, namely, from each of the holding portions 27 and 32 and both end portions of the top wall portion 17a corresponding to each of the holding portions 27 and 32, whereby the blade rubber 16 elastically contacts with the windshield glass 12.

Figure 5A:
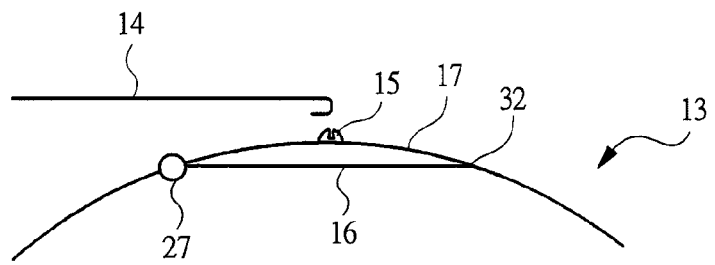
FIGS. 5A to 5D are explanatory diagrams each showing a shape variation of a blade rubber caused when the wiper blade shown in FIG. 1 contacts with a windshield glass.
Figure 5B:
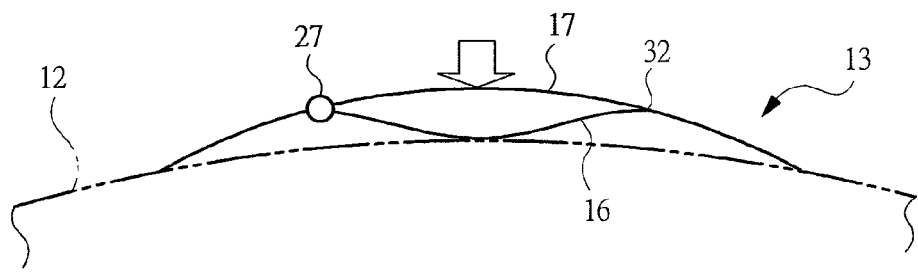
Figure 5C:
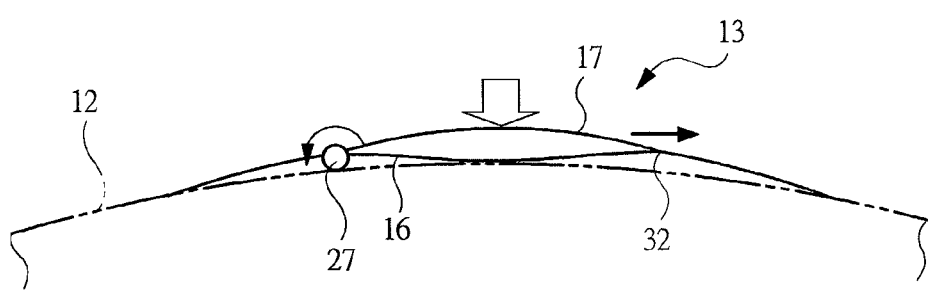
Figure 5D:
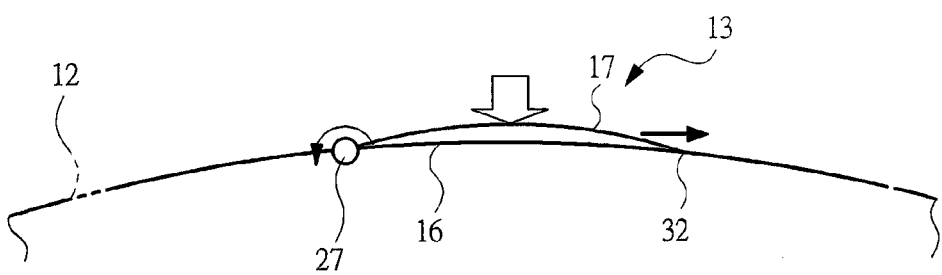

FIGS. 5A to 5D are explanatory diagrams each showing a shape variation of the blade rubber when the wiper blade contacts with the windshield glass. When the wiper blade 13 does not contact with the windshield glass 12, as shown in FIG. 5A, the blade rubber 16 is curved in a closing direction toward a glass face with curvature further larger than the maximum curvature within a wiping range of the windshield glass 12. When the wiper blade 13 is set to the windshield glass 12 from this state, both end portions of the blade rubber 16 in the longitudinal direction first contact with the glass face. When a pressing force (shown by the arrow in FIG. 5B) of the wiper arm 14 is applied to the rubber blade 16 via the rubber holder 17 in a state where both end portions of the blade rubber 16 in the longitudinal direction contact with the glass face, as shown in FIG. 5B, the blade rubber 16 is deformed in such a M shape that its central portion contacts with the glass face. At this time, since movement of the blade rubber 16 to the rubber holder 17 in the axial direction is restricted at the holding portion 27 and movement thereof in the axial direction is allowed at the holding portion 32, the blade rubber 16 can be deformed along the glass face according to an increase of the pressing force from the wiper arm 14. As shown in FIG. 5C, the blade rubber 16 is gradually deformed so as to conform with the glass face. When the blade rubber 16 is completely set on the glass face, as shown in FIG. 5D, the entire longitudinal-directional portion of the wiper blade contacts with the glass face due to the pressing force from the wiper arm 14 to take takes a wiping attitude. At this time, since the leaf-spring member 25 is also elastically deformed to a shape of conforming with the glass face similarly to the blade rubber 16, the pressing force of the wiper arm 14 applied to the rubber holder 17 via the attaching portion 15 is dispersed in the longitudinal direction of the blade rubber 16 according to elastic deformation of the leaf-spring member 25, so that the blade rubber 16 contacts with the windshield glass 12 with uniform distribution pressure in the longitudinal direction. Accordingly, a wiping operation of the blade rubber 16 is performed in a state where the entire longitudinal-directional portion of the blade rubber contacts uniformly with the windshield glass 12, whereby the excellent wiping performance can be achieved.

Figure 6:
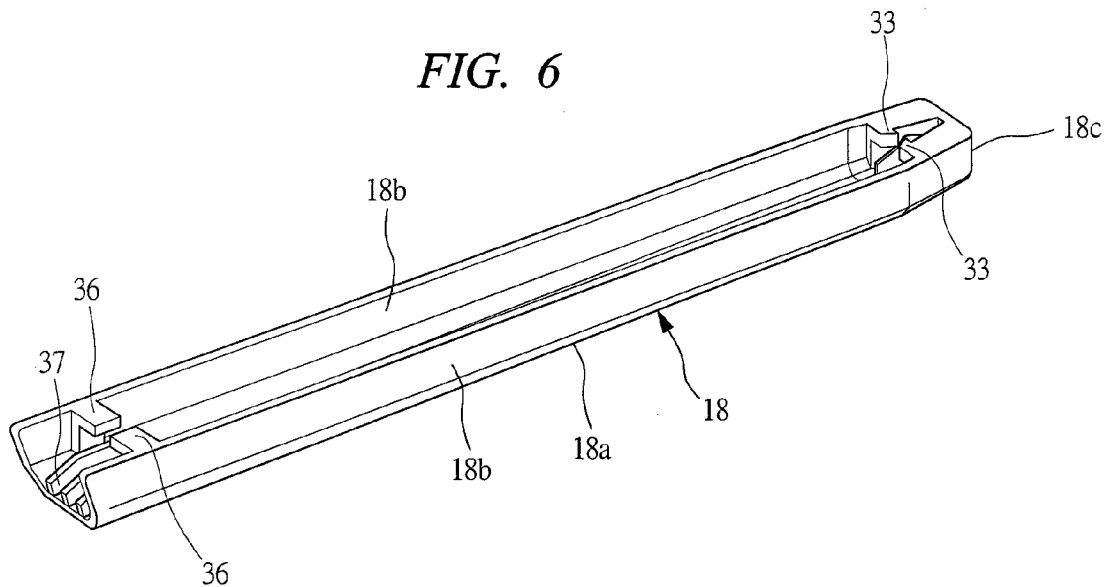
FIG. 6 is a perspective view showing a detail of the cover shown in FIG. 2.
Figure 7:
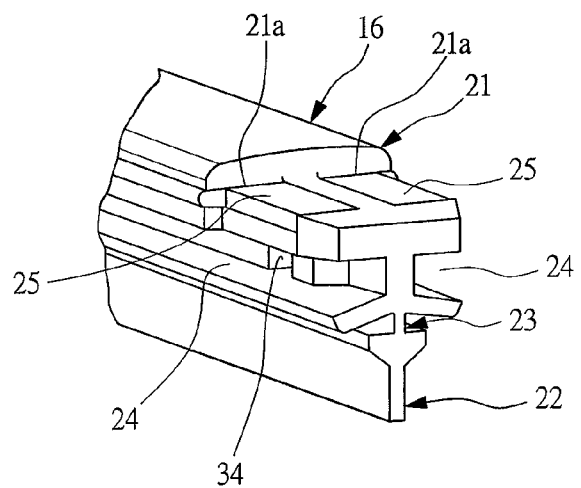
FIG. 7 is a perspective view showing a detail of a tip portion of a blade rubber shown in FIG. 2.
Figure 8A:
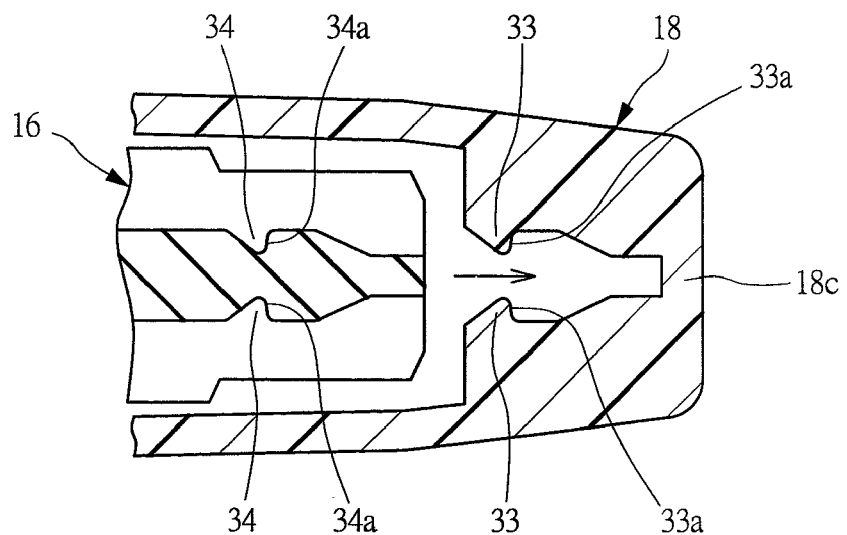
FIGS. 8A and 8B are sectional views showing a fixing procedure of the cover to the blade rubber.
Figure 8B:
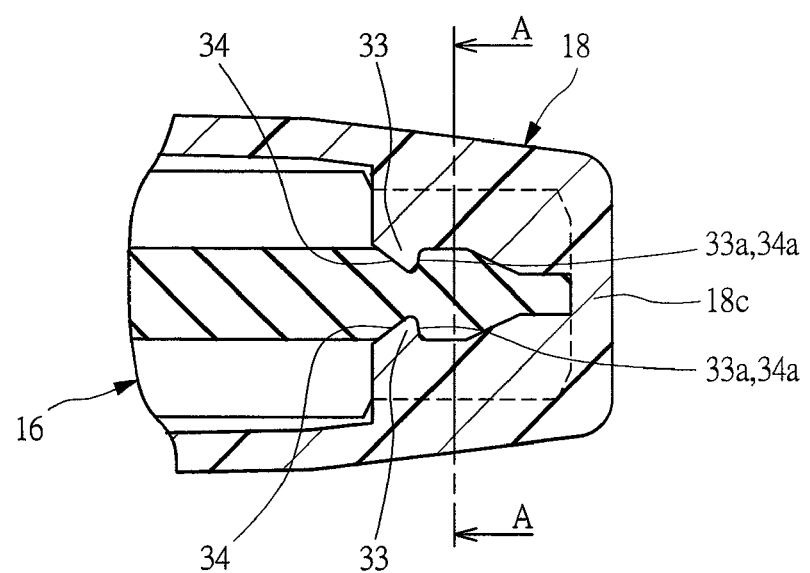
Figure 9:
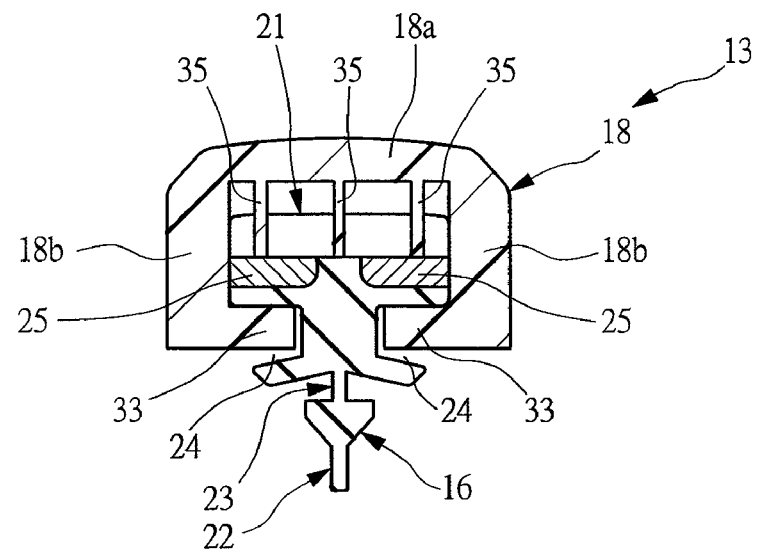
FIG. 9 is a sectional view taken along line A-A in FIG. 8A.
Figure 10:
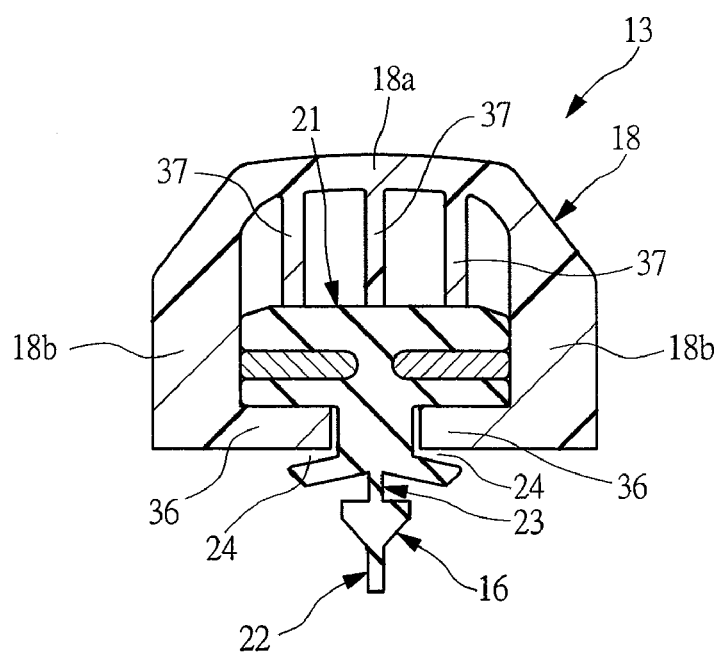
FIG. 10 is a sectional view showing a state of engaging the holding portion shown in FIG. 6 with the blade rubber.

FIG. 6 is a perspective view showing a detail of the cover shown in FIG. 2, and FIG. 7 is a perspective view showing a detail of a tip portion of the blade rubber shown in FIG. 2. FIGS. 8A and 8B are sectional views each showing a fixing procedure of the cover to the blade rubber; FIG. 9 is a sectional view taken along line A-A in FIG. 8B; and FIG. 10 is a sectional view showing a state of engaging the holding portion shown in FIG. 6 with the blade rubber. Incidentally, in the embodiment, a pair of covers 18 are provided on the wiper blade 13, and since the covers 18 have almost the same structure except for their left-right symmetry, only one of the covers 18 will be explained below.

As shown in FIG. 6, the covers 18 are each made of a resin material and formed into a U-shaped cross section, which includes a top wall portion 18a and a pair of side wall portions 18b, and they are provided, as shown in FIG. 1, in alignment with the rubber holder 17 in the longitudinal direction of the rubber holder 17 to cover a tip portion of the blade rubber 16 which is not covered with the rubber holder 17. Also, an end wall portion 18c is provided at a tip portion of the cover 18 in a longitudinal direction, and the cover 18 covers a tip portion of the blade rubber 16 with the end wall portion 18c. Thereby, only one portion of the lip portion 22 of the blade rubber 16 is exposed to the outside and the entirety of the remaining portion of blade rubber 16 is covered with the rubber holder 17 and the covers 18.

As shown in FIG. 6, a pair of stopper claws 33 serving as portions to be engaged are formed at a tip of the cover 18 corresponding to the tip of the blade rubber 16 and, as shown in FIG. 7, a pair of stopper grooves 34 serving as engagement portions located inside the holding grooves 24 to correspond to the stopper claws 33 are formed at the tip of the blade rubber 16. As shown in FIG. 8A, each of the stopper grooves 34 includes a securing face 34a perpendicular to the longitudinal direction of the blade rubber 16, and each of the stopper claws 33 includes a face to be secured 33a parallel to the securing face 34a. When the cover 18 is assembled to the blade rubber 16 from its tip end, as shown in FIG. 8B, the securing faces 34a and the faces to be engaged 33a, namely, the stopper claws 33 and the stopper grooves 34 are engaged with each other and the tip of the blade rubber 16 abuts on the end wall portion 18c of the cover 18, so that the movement of the cover 18 to the blade rubber 16 in the longitudinal direction is restricted. At this time, as shown in FIG. 9, the head portion 21 of the blade rubber 16 is sandwiched and inserted between the pressing plates 35 provided on the top wall portion 18a and the stopper claws 33 and is sandwiched and inserted between the both side wall portions 18b of the cover 18, so that the cover 18 is mounted on the blade rubber 16 in a state of being fixed to the tip of the blade rubber 16.

On the other hand, as shown in FIG. 6, a pair of holding pieces 36 protruding from the side wall portions 18b toward the holding grooves 24 of the blade rubber 16 are respectively provided on the other end of the cover 18. The holding pieces 36 are inserted into the holding grooves 24 prior to the stopper claws 33. When the stopper claws 33 are engaged with the stopper grooves 34, the holding pieces 36 have been engaged with the holding grooves 24 at positions adjacent to the rubber holder 17, as shown in FIG. 10. At this time, the holding pieces 36 are movable along the holding grooves 24 like the second holding claws 31 of the rubber holder 17. The head portion 21 is sandwiched and inserted between the pressing plates 37 provided on the top wall portion 18a and the holding pieces 36 and between the both side wall portions 18b, so that the movements of the cover 18 to the blade rubber 16 in the wiping direction and in a direction perpendicular to the windshield glass 12 are restricted.

Thus, since the cover 18 is fixed to the blade rubber 16 by the stopper claws 33 and is held by the holding pieces 36 so as to be movable axially to the blade rubber 16, when the blade rubber 16 has been elastically deformed in a direction perpendicular to the windshield glass 12, the holding pieces 36 are moved along the holding grooves 24 according to variation of curvature of the blade rubber 16, whereby elastic deformation of the blade rubber 16 to the cover 18 is allowed. That is, the cover 18 covers the blade rubber 16 in a state where the blade rubber 16 is elastically deformable in the direction perpendicular to the windshield glass 12.

Also, the cover 18 is mounted on the blade rubber 16, but is not linked to the rubber holder 17, and a slight gap is provided between the cover 18 and the rubber holder 17. Accordingly, when the blade rubber 16 is elastically deformed so that the degree of curvature thereof is changed, the cover 18 is freely swung to the rubber holder 17 in a direction perpendicular to the windshield glass 12, so that elastic deformation of the wiper blade 13 is allowed. Thus, since the cover 18 can be swung to the rubber holder 17 in the direction perpendicular to the windshield glass 12, even if the cover 18 is mounted on the blade rubber 16, elastic deformation of the blade rubber 16 is not blocked. The pressing force of the wiper arm 14 is transmitted to the blade rubber 16 via the rubber holder 17, but the cover 18 is only rotatable in the direction perpendicular to the rubber holder 17 and does not transmit the pressing force of the wiper arm 14 to the blade rubber 16.

Thus, in the wiper blade 13, since the covers 18 are provided to be aligned in the longitudinal direction of the rubber holder 17, the entire blade rubber 16 can be covered with the rubber holder 17 and the covers 18. Therefore, the leaf-spring member 25 mounted on the blade rubber 16, burrs occurring in molding the blade rubber 16, and the like can be concealed by the covers 18 so as not to be viewed from the outside, so that the fine appearance of the wiper blade 13 can be improved. Especially, the rubber holder 17 is formed into a U-shaped cross section which is continuous to the cover 18, so that wiper blade 13 can be formed with a sense of unity.

Also, in the wiper blade 13, since the cover 18 is formed independently of the rubber holder 17 and is detachable from the blade rubber 16, when a plurality of kinds of covers different in length dimension are prepared, the same kind of rubber holders 17 can be shared with a plurality of kinds of blade rubbers different in length dimension. Thereby, versatility of the wiper blade 13 can be enhanced.

Further, in the wiper blade 13, since the blade rubber 16 is assembled to the cover 18 from its tip side, a tip face of the blade rubber 16 in the longitudinal direction can be covered by providing the end wall portion 18c to the cover 18. Therefore, the fine appearance of the wiper blade 13 can be further improved. Also, since the cover 18 can be mounted while the blade rubber 16 has been mounted on the rubber holder 17, a mounting property of the cover 18 is enhanced.

Furthermore, in the wiper blade 13, since both the side wall portions 18b of the cover 18 are opposed to side portions of the head portion 21 of the blade rubber 16, the leaf-spring member 25 is prevented from being detached from the attaching groove 21a at the tip side of the blade rubber 16.

Figure 11:
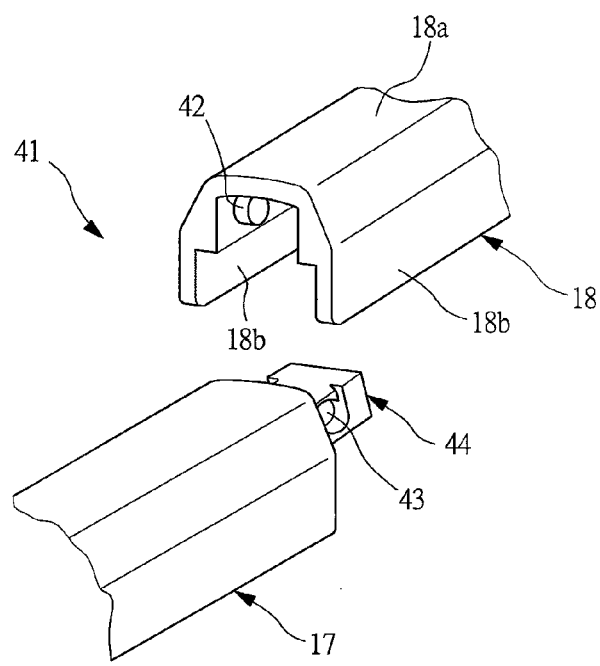
FIG. 11 is a perspective view showing a modification of the wiper blade shown in FIG. 1.
Figure 12A:
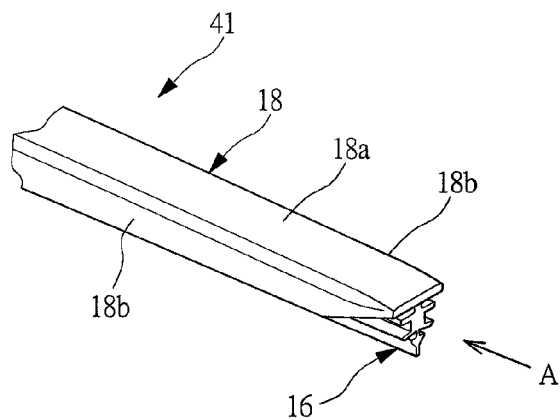
FIG. 12A is a perspective view showing a tip shape of a cover shown in FIG. 11
Figure 12B:
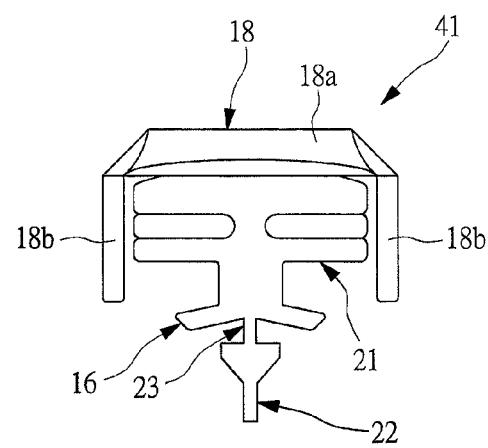
FIG. 12B is a front view of the cover seen from arrow A shown in FIG. 12A.

FIG. 11 is a perspective view showing a modification of the wiper blade shown in FIG. 1; FIG. 12A is a perspective view showing a tip shape of the cover shown in FIG. 11; and FIG. 12B is a front view as viewed from arrow A-A shown in FIG. 12A. Incidentally, in FIGS. 11 and 12, the same reference numerals are denoted to members corresponding to the abovementioned members.

The cover 18 used for the wiper blade 13 shown in FIG. 1 is mounted on the blade rubber 16 by the stopper claws 33 and the holding pieces 36, but the cover 18 is mounted on the rubber holder 17 in a wiper blade 41 shown in FIG. 11. Therefore, projecting portions 42 (only one of which is shown in FIG. 11) with circular cross sections protruding from inner faces of the side wall portions 18b are each provided on an end portion of the cover 18 located on a side of the rubber holder 17, while engagement boss portion 44 including engagement concave portions 43 (only one of which is shown in FIG. 11) engaged with the projecting portions 42 is provided to the rubber holder 17. If the projecting portions 42 are engaged with the engagement concave portions 43, the cover 18 is swingably linked to the rubber holder 17 in the direction perpendicular to the windshield glass 12. In this case, engagement of the projecting portions 42 and the engagement concave portions 43 with each other is set to have slight play, so that in wiping snow adhering to the windshield glass 12, for example, when an external force is applied to the cover 18, the external force is relieved through the play to prevent damage of the projecting portions 42 or the engagement concave portions 44. Incidentally, an engaging relationship between the projecting portion 42 and the engagement concave portion 43 may be such that the engagement concave portion 43 is provided to the cover 18 and the projecting portion 42 engaged with the engagement concave portion 43 provided on a side of the cover 18 is provided to the rubber holder 17.

Also, in the wiper blade 41, as shown in FIGS. 12A and 12B, the tip of the cover 18 is opened. That is, the end wall portion 18c is not provided at the end portion of the cover 18 located on a tip side of the blade rubber 16, and the tip of the blade rubber 16 is exposed from the cover 18. Thereby, replacement of the blade rubber 16 with another blade rubber can be performed in a state where the cover 18 is linked to the rubber holder 17.

Figure 13:
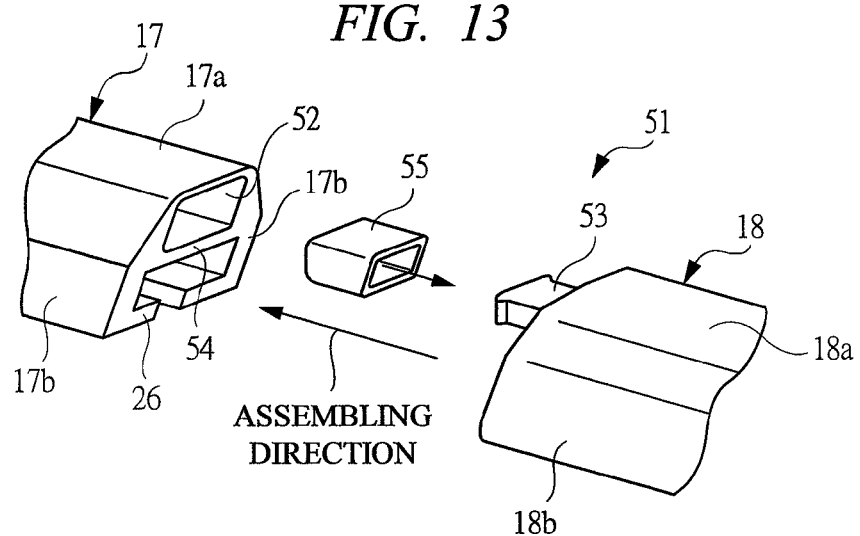
FIG. 13 is an exploded perspective view showing a modification of a coupling structure of the cover and the rubber holder as shown in FIG. 11.
Figure 14:
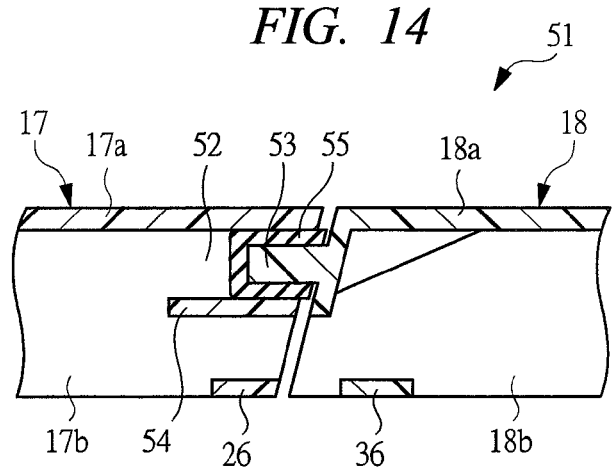
FIG. 14 is a sectional view showing a state of linking the cover shown in FIG. 13 to the rubber holder.

FIG. 13 is an exploded perspective view showing a modification of a coupling structure of the cover shown in FIG. 11 and the rubber holder, and FIG. 14 is a sectional view showing a state of linking the cover shown in FIG. 13 to the rubber holder.

In a wiper blade 51 shown in FIG. 13, in order to swingably link the cover 18 to the rubber holder 17, an engagement hole 52 is provided to the end portion of the rubber holder 17 in the longitudinal direction and an engagement projection 53 is provided to the end portion of the cover 18 located on the side of the rubber holder 17.

As shown in FIG. 14, the engagement hole 52 is partitioned and formed by the top wall portion 17a of the rubber holder 17, an engagement wall 54 formed in parallel with the top wall portion, and the pair of side wall portions 17b, wherein an axial core thereof is directed to the longitudinal direction to open toward the cover 18. On the other hand, the engagement projection 53 is formed integrally with the cover 18, and protrudes from the end portion of the cover 18 toward the rubber holder 17. The cover 18 is linked to the rubber holder 17 by inserting the engagement projection 53 into the engagement hole 52 of the rubber holder 17 to be engaged with the engagement hole 52.

When being illustrated, the engagement projection 53 is covered with a rubber-made cap 55 and the engagement projection 53 is engaged with the engagement hole 52 in a state of sandwiching the cap 55 between the engagement projection 53 and the engagement hole 52. Therefore, the engagement projection 53 can tilt to the engagement hole 52 according to elastic deformation of the cap 55, so that the cover 18 is can be swung to the rubber holder 17 in the direction perpendicular to the windshield glass 12.

Incidentally, in this case, the holder pieces 36 may or may not be provided to the cover 18.

Figure 15:
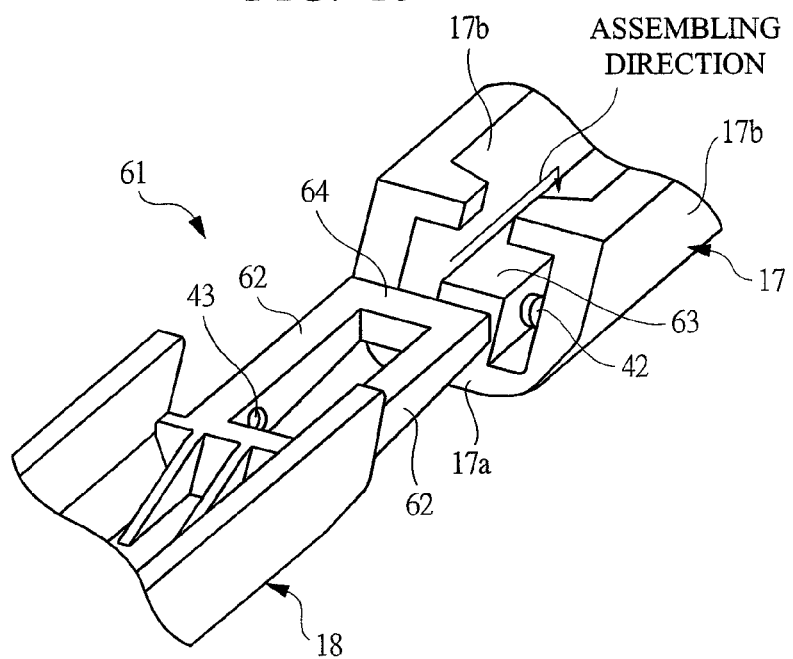
FIG. 15 is an exploded perspective view showing a modification of a coupling structure of the cover and the rubber holder as shown in FIG. 11.
Figure 16:
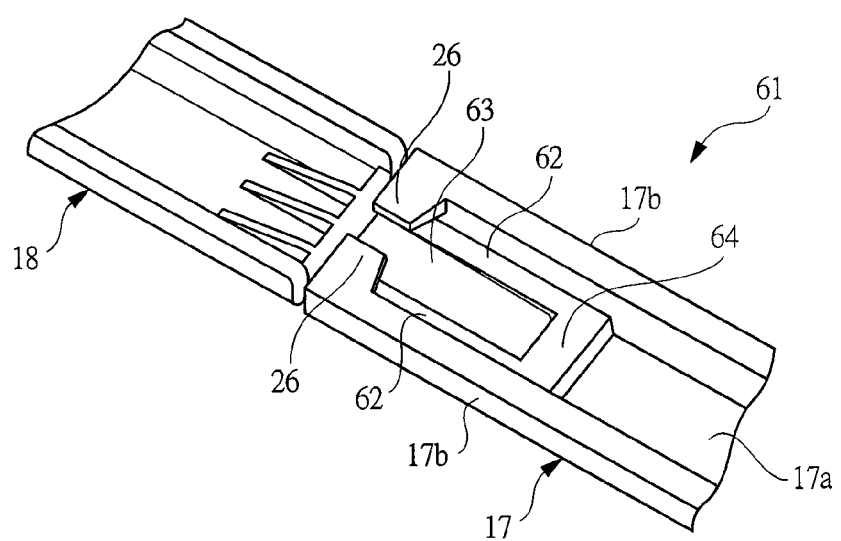
FIG. 16 is a sectional view showing a state of linking the cover shown in FIG. 15 to the rubber holder.

FIG. 15 is an exploded perspective view showing a modification of the coupling structure of the cover and the rubber holder shown in FIG. 11, and FIG. 16 is a perspective view showing a state of linking the cover shown in FIG. 15 to the cover.

In a wiper blade 61 shown in FIG. 15, in order to link the cover 18 to the rubber holder 17 swingably, a pair of leg portions 62 are provided to the cover 18 and an engagement piece 63 is provided to the top wall portion 17a of the rubber holder 17.

The pair of leg portions 62 are formed integrally with the cover 18 so as to protrude from the end portion of the cover 18 in the longitudinal direction toward the rubber holder 17, and the engagement concave portions 43 (only one of which is shown in FIG. 15) similar to those shown in FIG. 11 are formed on inward faces of the leg portions, respectively. The leg portions 62 are arranged per predetermined interval from each other in the wiping direction, and the tips thereof are linked to each other by a coupling piece 64. On the other hand, the engagement piece 63 provided in the rubber holder 17 is formed into a block shape provided integrally with the rubber holder 17 to protrude from the top wall portion 17a toward the windshield glass 12. A Gap slightly larger than a width dimension of the leg portion 62 is provided between the engagement piece 63 and each side wall portions 17b. Also, projecting portions 42 (only one of which is shown in FIG. 15) similar to those shown in FIG. 11 are formed on side faces of the engagement piece 63 facing the side wall portions 17b so as to protrude toward the gaps.

As shown in FIG. 16, when both the leg portions 62 are disposed in the gaps between the engagement piece 63 and the side wall portions 17b and the projecting portions 42 are engaged with the engagement concave portions 43, the cover 18 is swingably assembled to the rubber holder 17. At this time, since each leg portion 62 is disposed between the side wall portion 17b and the engagement piece 63, play of the cover 18 to the rubber holder 17 can be eliminated. Also, even if any load is applied to the cover 18 in the wiping direction, the load is received by the side faces of the leg portions 62 and the side faces of the engagement piece 63, whereby sufficient strength to the load can be ensured.

Incidentally, also in FIG. 13 to FIG. 16, the same reference numerals are denoted to members corresponding to the aforementioned members.

Figure 17:
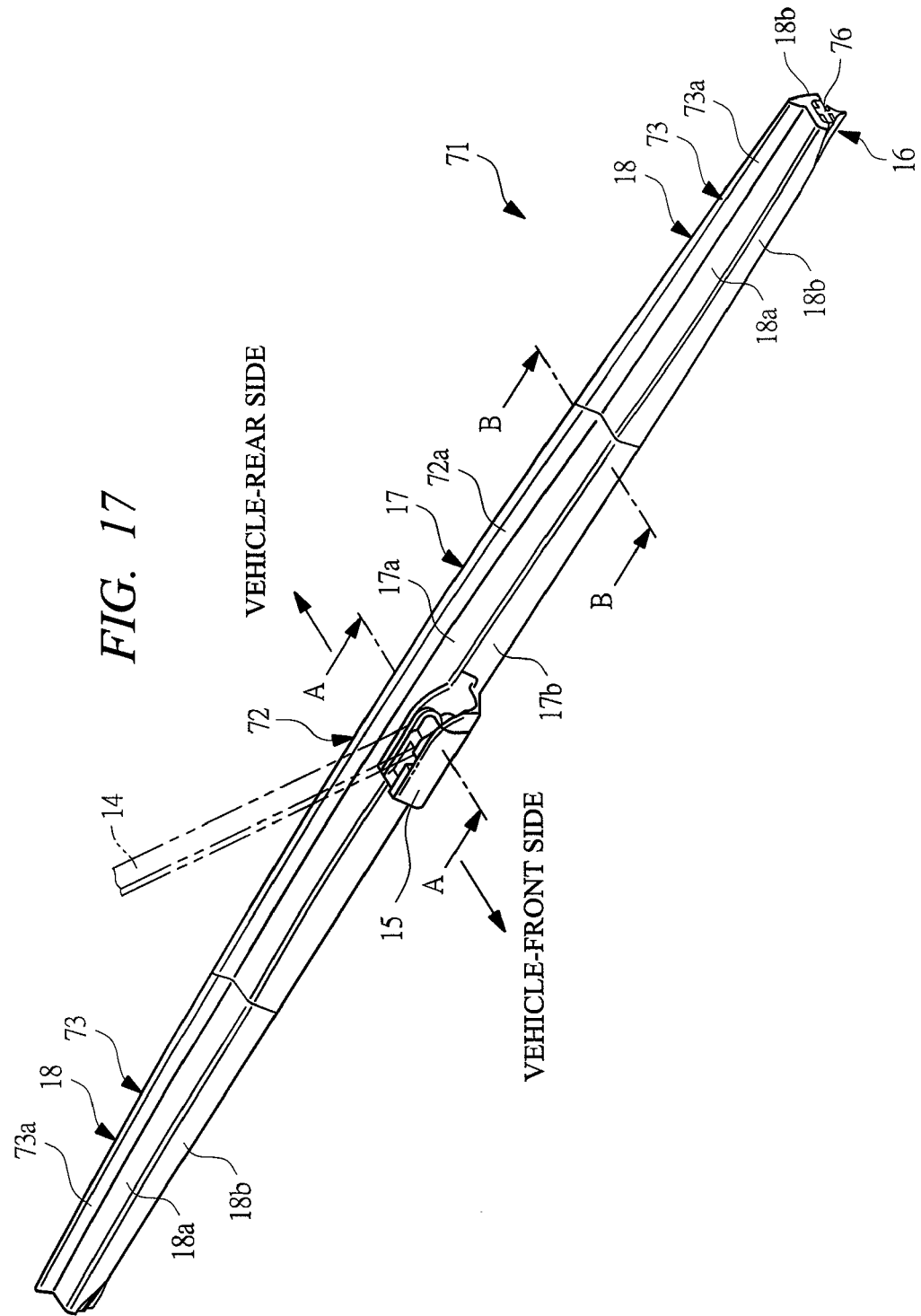
FIG. 17 is a perspective view showing a modification of the wiper blade shown in FIG. 1.
Figure 18:
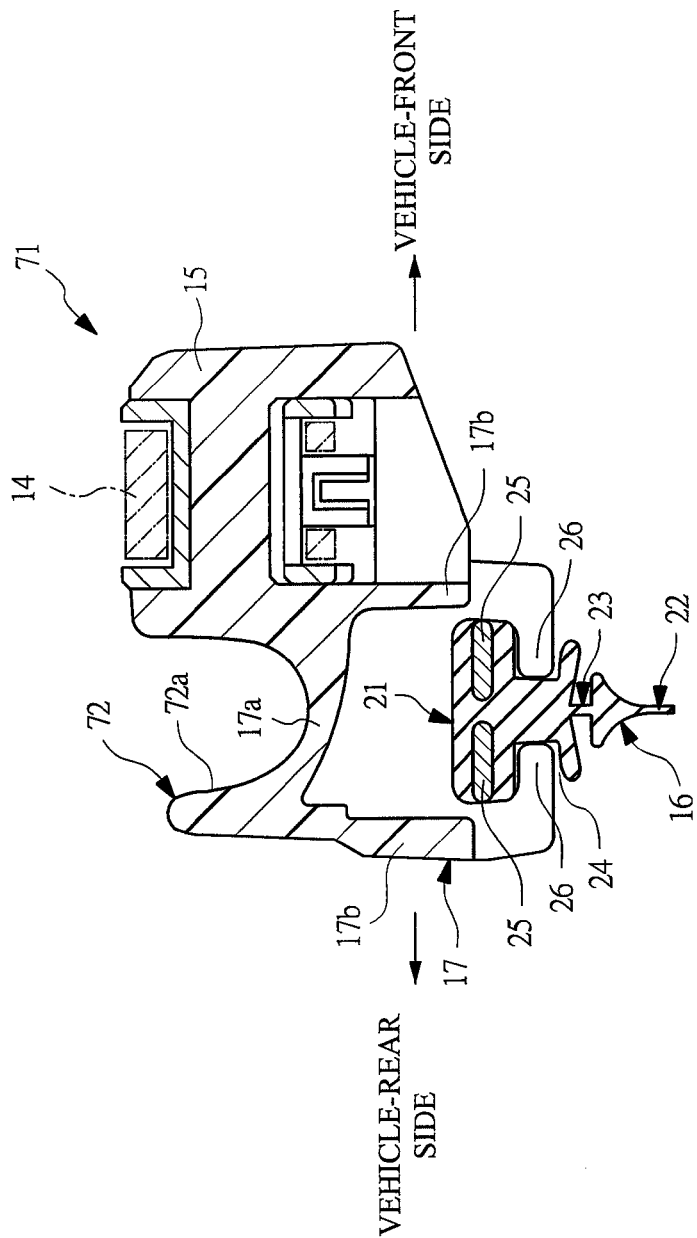
FIG. 18 is a sectional view taken along line A-A shown in FIG. 17.
Figure 19A:
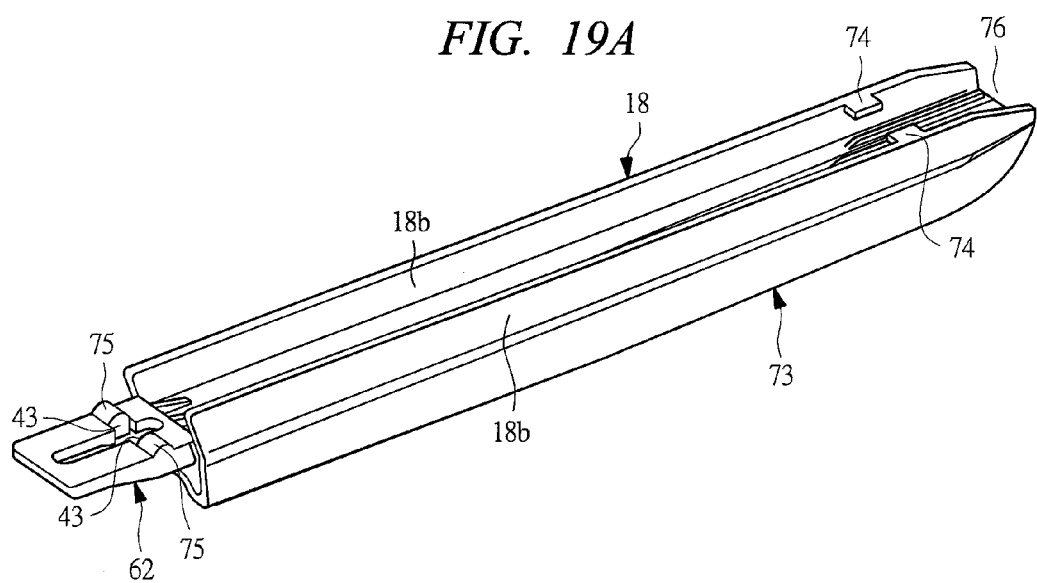
FIGS. 19A and 19B are perspective views each showing a detail of a cover shown in FIG. 17.
Figure 19B:
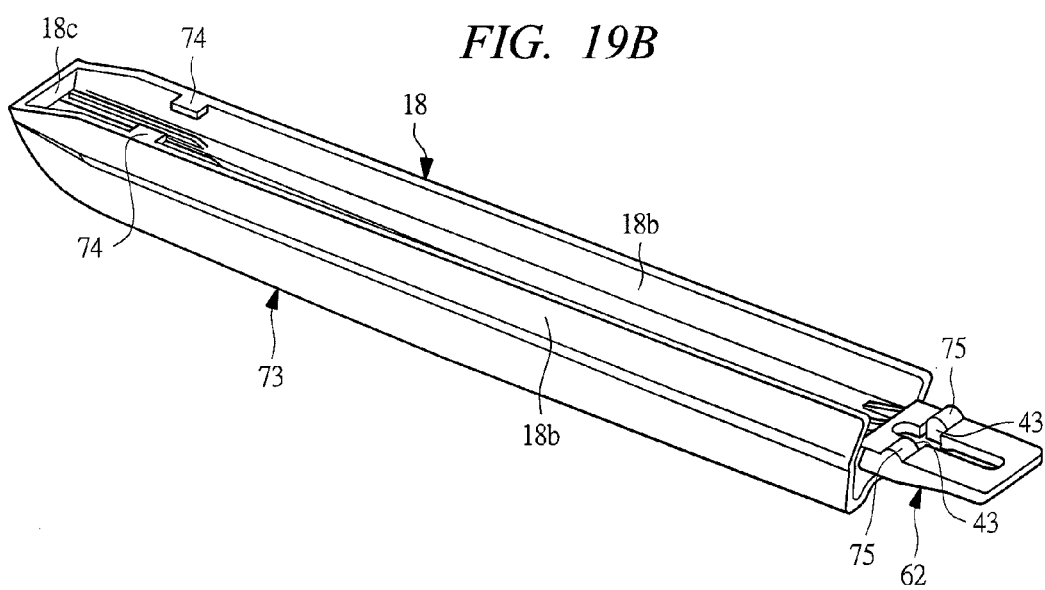
Figure 20:
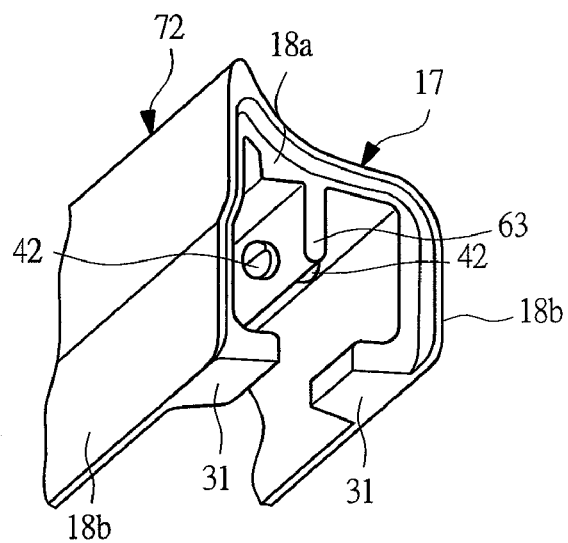
FIG. 20 is a perspective view showing a detail of a projecting portion provided on a rubber holder shown in FIG. 17.
Figure 21:
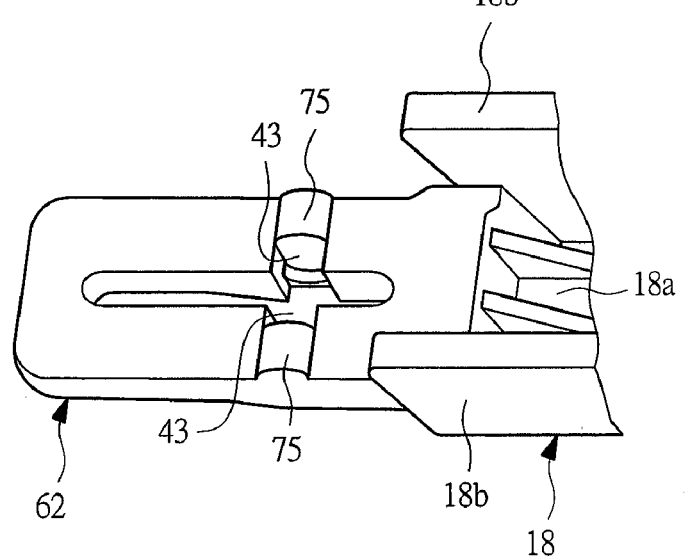
FIG. 21 is a perspective view showing a detail of a leg portion of the cover shown in FIG. 19.
Figure 22:
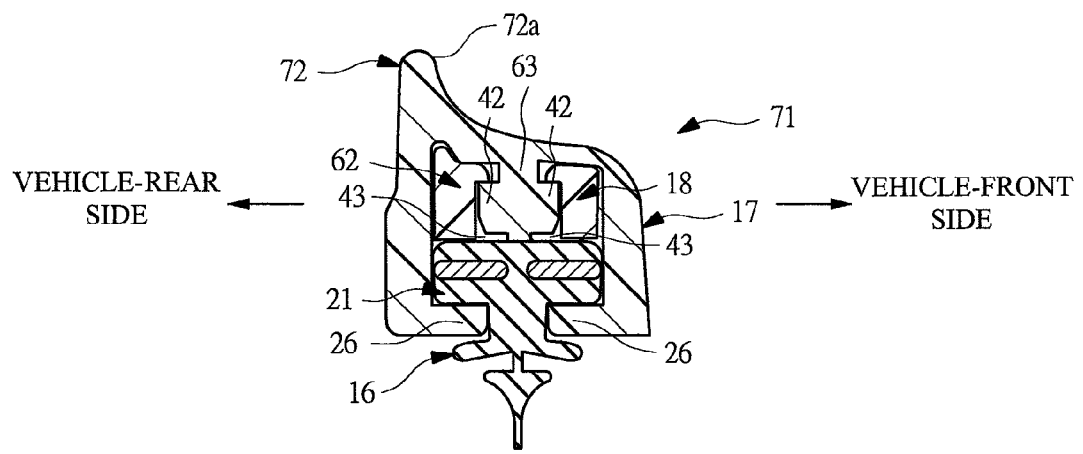
FIG. 22 is a sectional view taken along line B-B shown in FIG. 17.
Figure 23:
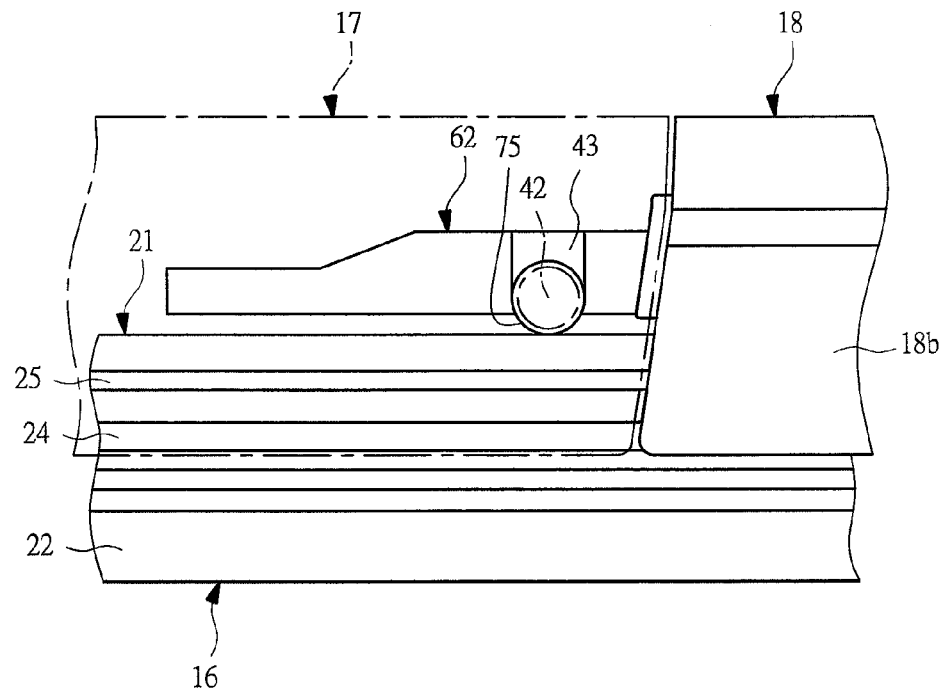
FIG. 23 is an explanatory diagram schematically showing a linking portion of a rubber holder and a cover.

FIG. 17 is a perspective view showing a modification of the wiper blade shown in FIG. 1; FIG. 18 is a perspective view taken along line A-A shown in FIG. 17; and FIGS. 19A and 19B are perspective views each showing a detail of a cover shown in FIG. 17. Also, FIG. 20 is a perspective view showing a detail of a projecting portion provided to a rubber holder shown in FIG. 17; FIG. 21 is a perspective view showing a detail of a leg portion of the cover shown in FIGS. 19A and 19B; FIG. 22 is a sectional view taken along line B-B shown in FIG. 17; and FIG. 23 is an explanatory diagram schematically showing a linking portion of the rubber holder and the cover. Incidentally, in FIG. 17 to FIG. 23, the same reference numerals are denoted to members corresponding to the aforementioned members.

In the wiper blade 13 shown in FIG. 1, the attaching portion 15 of the rubber holder 17 to the wiper arm 14 is provided to an approximately intermediate portion of the top wall portion 17a in the longitudinal direction. However, in a wiper blade 71 shown in FIG. 17, the attaching portion 15 is provided at an approximately intermediate portion of the side wall portion 17b of the rubber holder 17, as understood also from FIG. 18. That is, the wiper blade 71 is of a side connection type in which the attaching portion 15 is disposed so as to be offset to the rubber holder 17 in the wiping direction. Thereby, a position of the attaching portion 15 can be set low, so that a wide view of a driver or the like from a windshield glass 12 can be ensured by reducing a height dimension of the wiper blade 71.

In order to improve an aerodynamic characteristic during running of a vehicle, in the wiper blade 71, a fin portion 72 extending along the entire longitudinal-directional portion of the rubber holder 17 is provided on the top wall portion 17a of the rubber holder 17, and a fin portion 73 extending along the entire longitudinal-directional portion of the top wall portion 18a of each cover 18 is provided on the top wall portion 18a. The fin portions 72 and 73 are disposed so as to be mutually aligned in the longitudinal direction, whereby the wiper blade 71 is formed into a fin shape as a whole. The fin portions 72 and 73 have wind receiving faces 72a and 73a inclined in a direction of separating from the windshield glass 12 from a front side of the vehicle 11 toward a rear side thereof when the wiper arm 14 is at a stoppage position, namely, when the wiper blade 71 is at a lower reverting position. Therefore, the wind receiving faces 72a and 73a receive running wind during running of the vehicle so that the wiper blade 71 generates a pressing force toward the windshield glass 12.

Thus, in the wiper blade 71, since the fin portions 72 and 73 are provided to the top wall portion 17a of the rubber holder 17 and the top wall portion 18a of the cover 18, floating of the wiper blade 71 during running of the vehicle is prevented, whereby wiping performance of the wiper blade 71 can be improved.

As shown in FIG. 19, in the wiper blade 71, the leg portion 62 is provided to the cover 18, and the engagement piece 63 (shown in FIG. 20) is provided to the top wall portion 17a of the rubber holder 17 similarly to the wiper blade 61 shown in FIG. 15. Thereby, the cover 18 can be rotatably assembled to the rubber holder 17 when the projecting portion 42 provided to the engagement piece 63 is engaged with the engagement concave portion 43 provided to the leg portion 62.

In the wiper blade 71, since the cover 18 is linked to the rubber holder 17 at the leg portion 62, both tip portions of the blade rubber 16 are not notched and the stopper claws 33 are not provided on the tip side of the cover 18. Instead of the stopper claws 33, the pair of holding pieces 74 protruding from the side wall portions 18b toward the holding grooves 24 of the blade rubber 16 are provided on the tip side of each of the covers 18, and the holding pieces 74 are engaged with the holding grooves 24, so that the blade rubber 16 is held on the tip side of the cover 18.

As shown in FIG. 21, a pair of supporting convex portions 75 each formed into a semi-cylindrical shape coaxial to the engagement concave portions 43 and projecting toward a side of the blade rubber 16 are provided so as to be adjacent to the respective engagement concave portions 43. When the blade rubber 16 is mounted on the rubber holder 17 or the cover 18, as shown in FIG. 23, the supporting convex portions 75 abut on a rear face of the blade rubber 16 (a face of the head portion 21 directed to an opposite side to the windshield glass 12). Thereby, since the cover 18 is supported to the blade rubber 16 via the supporting convex portions 75, assembling play between the engagement concave portion 43 and the projecting portion 42 can be suppressed and when the wiper blade 71 is reversed at a reversing position, an occurrence of abnormal noise from an engagement portion between the projecting portion 42 and the engagement concave portion 43 can be suppressed. Also, since the supporting convex portions 75 are formed coaxially with the engagement concave portions 43, even if the cover 18 is rotated to the rubber holder 17, the supporting convex portions 75 can always contact with a rear face of the blade rubber 16. Further, since the supporting convex portions 75 are formed into a semi-cylindrical shape, even if the cover 18 is rotated, the supporting convex portions 75 can follow the rear face of the blade rubber 16 smoothly.

As shown in FIG. 19A, in the wiper blade 71, a notched portion 76 is formed in an end wall portion 18c of one of the covers 18, so that by forming the notched portion 75, the tip of the cover 18 is opened similarly to the cover 18 shown in FIG. 12. Thereby, the blade rubber 16 can be mounted on the cover 18 and the rubber holder 17 by inserting the blade rubber 16 from the notched portion 76 in a state of linking the cover 18 to the rubber holder 17. On the other hand, as shown in FIG. 19B, the end wall portion 18c is provided to the other of the covers 18, and the other tip portion of the blade rubber 16 is covered with the cover 18.

Incidentally, in the embodiment, the notched portion 7 is formed on the end wall portion 18c of only one of the covers 18, but the present invention is not limited to this and setting of the notched portion 76 can be modified variously according to an attaching state of the wiper blade 71 to the wiper arm 14.

Figure 24:
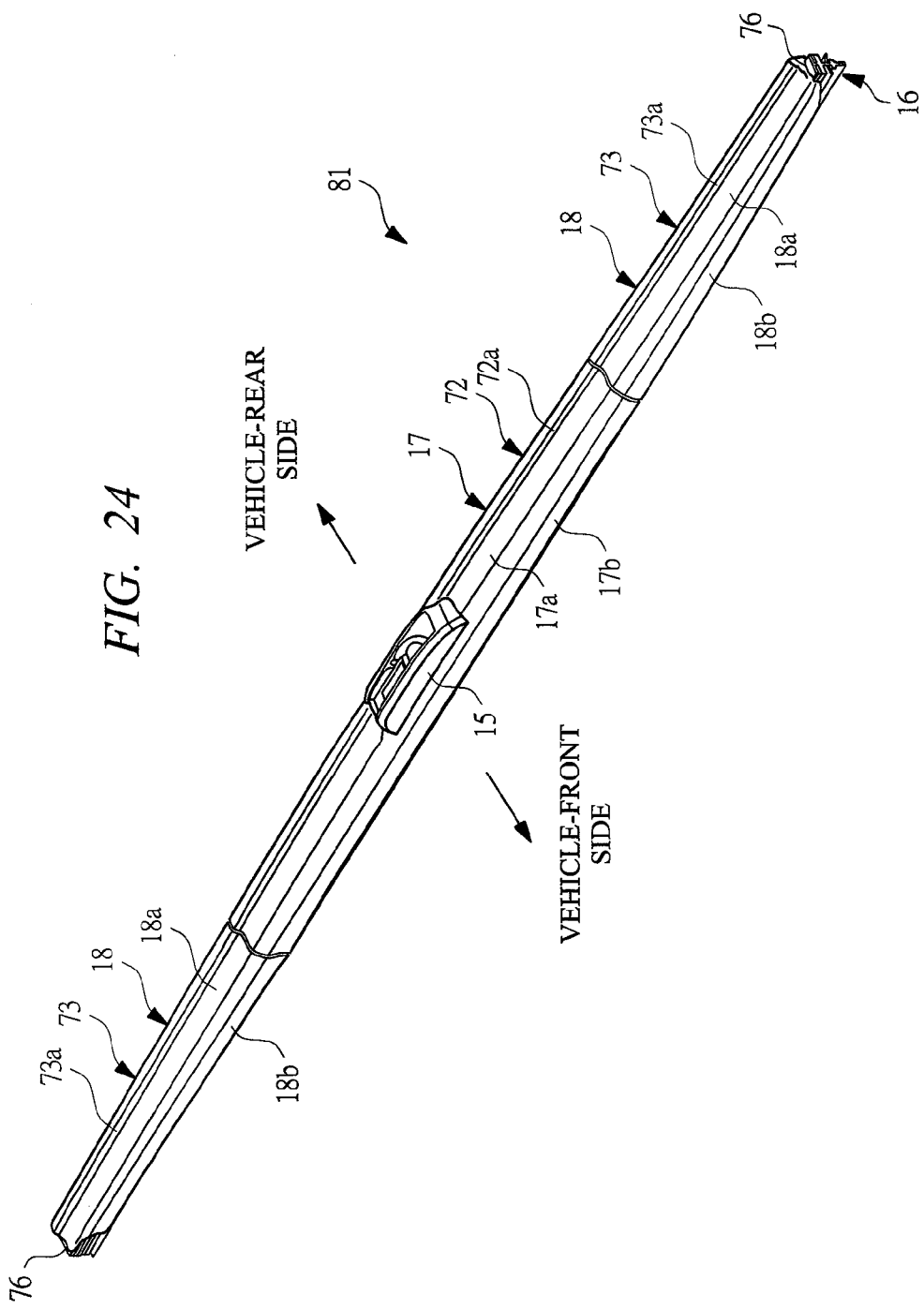
FIG. 24 is a perspective view showing a modification of the wiper blade shown in FIG. 1.
Figure 25:
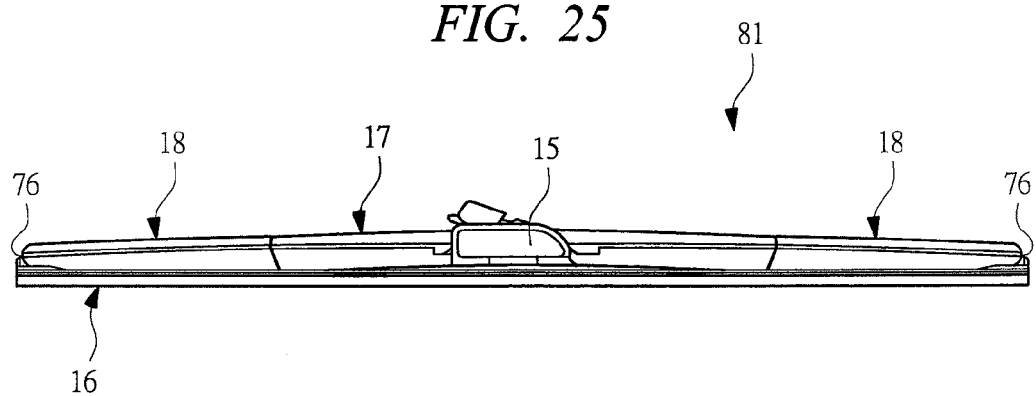
FIG. 25 is a front view of the wiper blade shown in FIG. 24.
Figure 26:
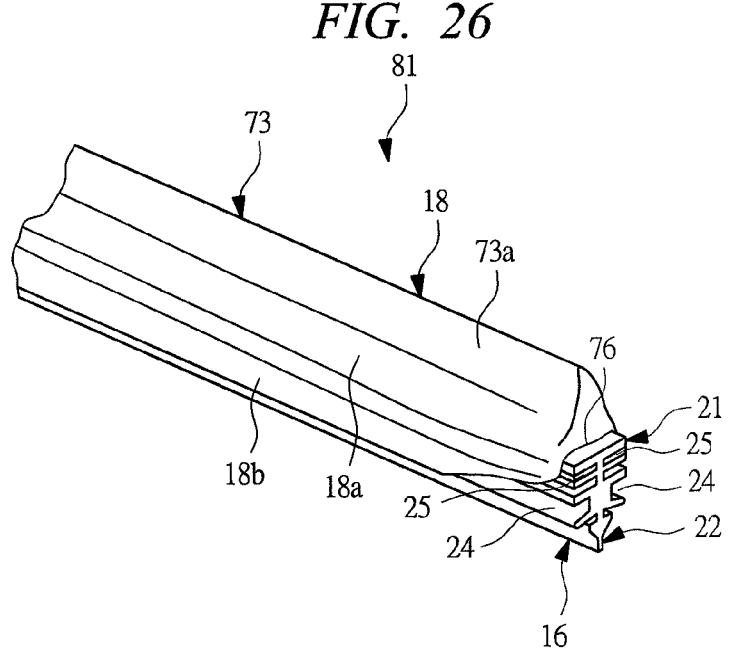
FIG. 26 is an enlarged view of a tip portion of the wiper blade shown in FIG. 24.

FIG. 24 is a perspective view showing a modification of the wiper blade shown in FIG. 1; FIG. 25 is a front view of the wiper blade shown in FIG. 24; and FIG. 26 is an enlarged view of a tip portion of the wiper blade shown in FIG. 24. Incidentally, in FIG. 24 to FIG. 26, the same reference numerals are denoted to members corresponding to the aforementioned members.

In a wiper blade 81 shown in FIG. 24, the attaching portion 15 of the rubber holder 17 to the wiper arm 14 is provided to an approximately intermediate portion of the top wall portion 17a in the longitudinal direction thereof similarly to the wiper blade 13 shown in FIG. 1. At the same time, the fin portion 72 extending along the entire longitudinal-directional portion of the top wall portion 17a of the rubber holder 17 is provided to the top wall portion 17a similarly to the wiper blade 71 shown in FIG. 17, and the fin portion 73 extending along the entire longitudinal-directional portion of the top wall portion 18a of each of the covers 18 is provided to the top wall portion 18a. In this case, the fin portion 72 provided to the rubber holder 17 is provided so as to extend from both sides of the attaching portion 15 toward a side of the covers 18, and is disposed to be aligned with the fin portions 73 of the covers 18 in the longitudinal direction. Also, the fin portions 72 and 73 are provided with the wind receiving faces 72a and 73a inclined in a direction of separating from the windshield glass 12 from the front side of the vehicle 11 toward the rear side thereof when the wiper arm 14 is at the stoppage position, namely, when the wiper blade 81 is at the lower reverting position. Therefore, the wind receiving faces 72a and 73a receive running wind during running of the vehicle, whereby the pressing force is generated at the wiper blade 81 toward the windshield glass 12.

Thus, in the wiper blade 81, since the fin portions 72 and 73 are provided to the top wall portion 17a of the rubber holder 17 and the top wall portions 18a of the covers 18, floating of the wiper blade 81 during running of the vehicle is prevented, so that wiping performance of the wiper blade 81 can be improved.

Further, in the wiper blade 81, the notched portions 76 are provided on the end wall portions 18c of both the covers 18, respectively, so that by forming such notched portions 76, the tip of each of the covers 18 is opened similarly to the cover 18 shown in FIG. 12. Also, as shown in FIG. 25, in the wiper blade 81, the length dimension of the blade rubber 16 is formed slightly longer than the entire length obtained by linking the rubber holder 17 and the respective covers 18, and both tips of the blade rubber 16 protrude from the notched portions 76 of the respective covers 18. Accordingly, for example, even when the tip portion of the wiper blade 81 collides against the windshield glass 12 accidentally during replacement work for the wiper blade 81, the blade rubber 16 instead of the cover 18 contacts with the windshield glass 12, so that damage of the cover 18 or the rubber holder 17 can be prevented.

Incidentally, in the embodiment, the tips of the blade rubber 16 protrude from both the covers 18, but the present invention is not limited to this. For example, when the notched portion 76 is formed on only one of the covers 18 similarly to the wiper blade 71 shown in FIG. 17, only one tip of the blade rubber 16 may protrude from the notched portion 76.

Needless to say, the present invention is not limited to the embodiments and may be variously modified within a scope of not departing from the gist of the invention. In the embodiments, for example, the wiper blade 13 is for wiping the front windshield glass 12 of the vehicle 11, but the present invention is not limited to this and may be for wiping a rear windshield glass of the vehicle 11.

Further, in the embodiment, the leaf-spring member 25 is mounted in the attaching groove 21*a* of the blade rubber 16, but the present invention is not limited to this and may have a structure in which the leaf-spring member 25 is directly fixed to the blade rubber 16 by adhesion or the like.

The present invention can be applied to the wiper blades used in wiper apparatuses of various types, such as tandem types or opposes-wiping types.

The present invention can be applied in manufacturing the wiper blade for wiping the windshield glass of the vehicle.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A wiper blade for wiping a windshield glass of a vehicle, the wiper blade comprising:
   a blade rubber including a lip portion for wiping a surface of the windshield glass, a head portion linked to the lip portion via a neck portion in which a pair of attaching grooves are formed, and a pair of holding grooves provided between the lip portion and the head portion and each provided with a stopper portion;
   a pair of spring members with elasticity and mounted respectively in the attaching grooves of the blade rubber;
   a rubber holder including a pair of side wall portions and a top wall portion linking mutually the side wall portions, the rubber holder holding the blade rubber by a pair of holding portions, each of which is provided to the side wall portions and has a pair of holding claws located in the holding grooves, so that the head portion of the blade rubber is arranged between the side wall portions of the rubber holder; and
   a cover aligned in a longitudinal direction of the rubber holder and linked to the rubber holder so as to be rotatable to the rubber holder in a direction perpendicular to the windshield glass, the cover covering the blade rubber in a state in which the blade rubber is elastically deformable in the direction perpendicular to the windshield glass,
   wherein the pair of holding claws engaged with the holding grooves are respectively provided to both end portions of each side wall portion of the rubber holder in the longitudinal direction, and an intermediate portion of the blade rubber is covered with the pair of holding claws, and
   wherein an engagement piece protruding toward the windshield glass is provided to the top wall portion of the rubber holder, a pair of leg portions protruding toward the rubber holder is provided to the cover, and the cover is assembled to the rubber holder by disposing the leg portions between the engagement piece and the side walls, respectively.

2. A wiper blade for wiping a windshield glass of a vehicle, the wiper blade comprising:
   a blade rubber including a lip portion for wiping a surface of the windshield glass, a head portion linked to the lip portion via a neck portion in which a pair of attaching grooves are formed, and a pair of holding grooves provided between the lip portion and the head portion and each provided with a stopper portion;
   a pair of spring members with elasticity and mounted respectively in the attaching grooves of the blade rubber;
   a rubber holder including a pair of side wall portions and a top wall portion linking mutually the side wall portions, a fin portion extending along an entire longitudinal-directional portion of the top wall portion being formed integrally with the top wall portion, and the rubber holder holding the blade rubber by a pair of holding portions, each of which is provided to the side wall portions and has a pair of holding claws located in the holding grooves, so that the head portion of the blade rubber is arranged between the side wall portions of the rubber holder; and
   a cover with a U-shaped cross section including a pair of side wall portions and a top wall portion mutually linking to the side wall portions, a fin portion extending along an entire longitudinal-directional portion of the top wall portion being formed at the top wall portion, the cover being disposed at each of both ends of the rubber holder in a longitudinal direction and being rotatably linked to the rubber holder in a direction perpendicular to the windshield glass, and the head portion of the blade rubber is arranged between the side wall portions of the cover, which covers the blade rubber by each of the pair of side wall portions and the top wall portion in a state in which the blade rubber is elastically deformable by each of the pair of side wall portions and the top wall portion in the direction perpendicular to the windshield glass,
   wherein an engagement piece protruding from the top wall portion of the rubber holder toward the windshield glass is provided to each of both ends of the rubber holder, a pair of leg portions protruding toward the rubber holder is provided to the cover, and the leg portions are respectively disposed between the engagement piece and the side wall portions to assemble the cover to the rubber holder.

3. The wiper blade according to claim 2, wherein a supporting convex portion abutting on a rear face of the blade rubber is provided to each of the leg portions.

4. The wiper blade according to claim 3, wherein an engagement concave portion engaged rotatably with a projecting portion provided to the engagement piece is provided to each of the leg portions, and the supporting concave portion is formed into a semi-cylindrical shape coaxial to the engagement concave portion.

5. The wiper blade according to claim 3, wherein an attaching portion for attaching the wiper arm swingable and reciprocable above the windshield glass is formed at the intermediate portion located on one side of the pair of side wall portions of the rubber holder.

6. The wiper blade according to claim 5, wherein the fin portion has a wind receiving face inclined in a direction of separating from the windshield glass from a front side of the vehicle toward a rear side thereof when the wiper arm is at a stoppage position.

* * * * *